United States Patent [19]

Kennedy

[11] Patent Number: 4,790,355

[45] Date of Patent: Dec. 13, 1988

[54] HELICOIDAL RAMP DROPSHAFT

[75] Inventor: John F. Kennedy, Iowa City, Iowa

[73] Assignee: University of Iowa Research Foundation, Iowa City, Iowa

[21] Appl. No.: 29,522

[22] Filed: Mar. 23, 1987

[51] Int. Cl.$^4$ .............................................. D21F 1/68
[52] U.S. Cl. .................................... 138/37; 138/42; 193/12; 55/52; 55/55; 55/177; 55/184; 55/191; 55/456
[58] Field of Search .................... 55/52, 55, 177, 178, 55/184, 191, 203, 204, 205, 348, 456; 138/37, 39, 42; 193/12

[56] References Cited

U.S. PATENT DOCUMENTS

| | | | |
|---|---|---|---|
| 1,928,489 | 9/1933 | Pardee | 193/12 |
| 2,323,525 | 7/1943 | Ebel et al. | 55/205 |
| 2,849,930 | 9/1958 | Freeman et al. | 55/191 X |
| 3,161,490 | 12/1964 | Dudek | 55/205 |
| 3,362,136 | 1/1968 | Burnham, Sr. et al. | 55/191 X |
| 4,272,258 | 6/1981 | Shifflett | 55/191 X |
| 4,714,522 | 12/1987 | Holik | 138/37 X |

FOREIGN PATENT DOCUMENTS

| | | | |
|---|---|---|---|
| 588343 | 12/1959 | Canada | 55/191 |
| 7900350 | 6/1979 | World Int. Prop. O. | 55/191 |

*Primary Examiner*—Henry J. Recla
*Attorney, Agent, or Firm*—Ferris M. Stout

[57] ABSTRACT

A vertical dropshaft having internal helicoidal ramps for dissipating the energy of liquid passing through the dropshaft and for exhausting air entrained by the falling liquid up the center of the dropshaft.

4 Claims, 3 Drawing Sheets

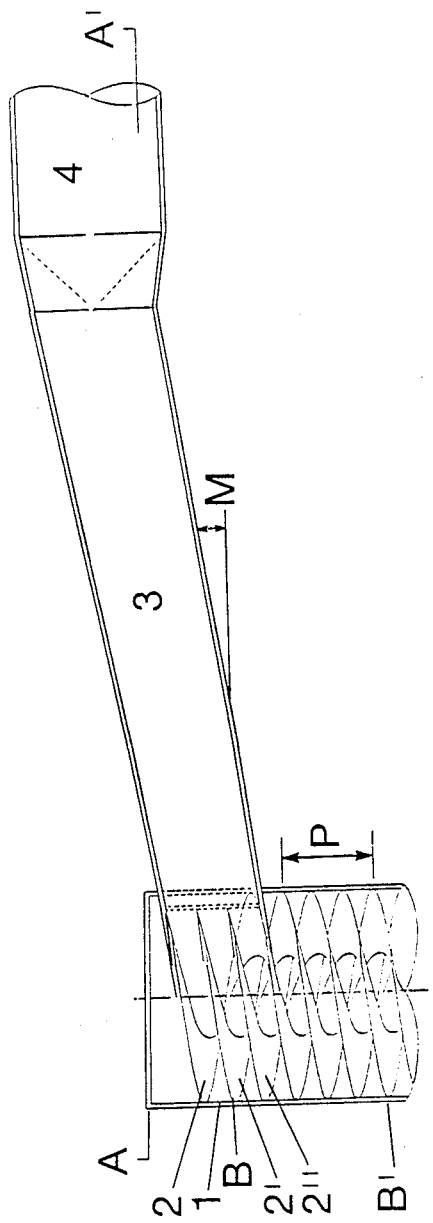
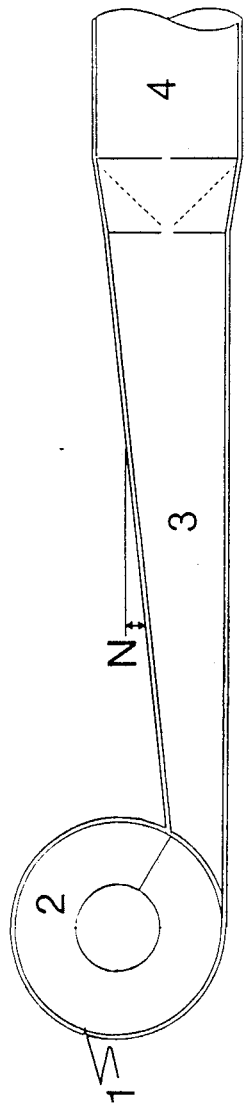
FIGURE 1
FIGURE 2

HELICOIDAL RAMP DROPSHAFT

BACKGROUND OF THE INVENTION

1. Field of the Invention

The invention is in the field of hydraulic energy dissipation and flow training in vertical conduits.

2. The Prior Art

Many situations arise in hydrualic engineering (and other branches of fluids engineering) in which large flows of water or other liquids must be conveyed from a higher to a lower elevation. Some examples of such situations:
  outlet structures and spillways in dams;
  bypasses around hydraulic turbines;
  bypass and overflow structures in cooling towers; and
  vertical conveyances for conducting stormwater surface runoff to underground tunnels, as in the TARP system of the city of Chicago.

In these situations the water falls through vertical conduits called dropshafts. The potential energy of the water at the higher elevation is converted into kinetic energy as the flow falls down the dropshaft, and this energy must be dissipated at the bottom of the dropshaft in such a way that it does not damage the structure. The falling water also entrains large quantities of air, which in many situations must be separated from the water and somehow vented to the surface before the water enters the conduit which conveys it away from the dropshaft. Otherwise the entrained air will coalesce in the conduit into large bubbles, which, being under considerable pressure at the depth of the conduit, can force their way up another dropshaft or a venting structure with energy sufficient to cause extensive damage.

Over the years two principal types of dropshafts have evolved. In one type, a structure at the entrance to the dropshaft conveys water to the top of the dropshaft, where it bends sharply downward in a vertical plane to direct the water downward. The water falls freely down the dropshaft. Collectively, such designs are called plunge-flow dropshafts. An example of a plunge-flow dropshaft is the simple case of an inflow conduit with a short radius elbow in a vertical plane. Plunge-flow dropshafts have a drawback: Water cascading down the dropshaft entrains large volumes of air. Large and often complex subterranean chambers are required to collect the entrained air and to vent it to the surface through special vents provided for the purpose. Moreover the kinetic energy of the falling water must be dissipated safely in a subterranean structure called a "plunge pool" or "energy dissipator".

A second design for dropshafts is the vortex type. In a vortex-type dropshaft, water is delivered into the top of the dropshaft tangentially and is directed slightly downward, so that the water swirls as it falls down the dropshaft. Inlets to vortex type dropshafts take several forms: spiral inlets, scroll inlets, and tangential inlets, among others. Centrifugal force resulting from the rotation of the water holds the flow against the dropshaft wall, forming a central vent through which entrained air can escape to the surface. The flow remains in contact with the dropshaft wall, and much of the energy dissipation occurs in wall friction. However, the high velocity of the free-falling spiral flow down the dropshaft, and its energy into the flooded pool at the bottom of the dropshaft, entrains large amounts of air. Therefore, a deaeration chamber must be installed at the bottom of vortex-type dropstructures that discharge into closed conduits, and the deaeration chamber must be vented to the surface.

The subterranean energy-dissipation and deaeration structures at the base of a dropshaft constitute a major fraction of the cost of the structure. Moreover, if they do not function as intended, there may result extensive damage to the dropshaft and the structure appurtenant to it. There exists therefore a need for a dropshaft design which minimizes the amount of energy which must be dissipated at the bottom of the dropshaft, which minimizes entrainment of air in the falling water, and which functions reliably over a wide range of discharges.

SUMMARY OF THE INVENTION

The invention comprises a dropshaft in which water is constrained to a helical path within the dropshaft by helicoidal ramps disposed along the inner walls of the dropshaft, the center of the dropshaft being open so that the flow surface is everywhere at atmospheric pressure. One or more inlets deliver water to the dropshaft nearly tangentially to its periphery, and at a velocity approximately equal to the uniform velocity flow in the helical channels formed by the ramps. An outlet conduit similarly conducts water out of the dropshaft more or less tangentially to the dropshaft wall and at approximately the inclination and speed of the uniform flow in the helical channels formed by the helicoidal ramps.

The ramps terminate about two helicoid-pitch diameters above the bottom of the dropshaft, and just above the top of the outlet conduit. The pool formed in the dropshaft below the ramps swirls vigorously, setting up centripetal forces which drive entrained air toward the center of the pool, where it is released into the vented core at the center of the dropshaft.

The friction factor of the flow in the helical channels formed by the ramps is significantly greater than that of an equivalent flow in a straight channel, because centrifugally induced Goertler vortices and other secondary-flow effects increase the rate of momentum transfer from the flow to the channel boundaries. This factor further reduces the speed and the kinetic energy of the flow. The energy of the flow is dissipated all along the helical path the flow is constrained to follow, instead of being concentrated in a plunge pool at the bottom of the dropshaft.

At no place in the structure does the flow velocity undergo an abrupt change in speed or in direction, both of which cause air entrainment. Whatever air is entrained is readily collected in the swirl pool at the bottom of the dropshaft, and is readily exhausted up the open center of the dropshaft. The need for a deaeration chamber and a separate vent to the surface is thereby eliminated.

With the energy dissipator and the deaeration chamber eliminated, the dropshaft can be installed much closer to the conduit which receives the flow. This greatly reduces excavation, material and construction costs. The savings greatly exceed the added cost of installing the helicoidal ramps in the dropshaft. The ramps can be fabricated at a site distance from the dropshaft; then be lowered into the dropshaft in sections, and be welded together in place.

BRIEF DESCRIPTION OF THE DRAWINGS

FIG. 1 is a cut-away view in elevation of the upper end of a triple-ramp dropshaft.

FIG. 2 is a cross-section plan view of the upper end of the dropshaft.

DESCRIPTION OF A PREFERRED EMBODIMENT

The figures show a preferred embodiment of the helicoidal ramp dropshaft: one having multiple, intertwined ramps, in this case three ramps, although it is to be understood that the invention also encompasses dropshafts with a single, double, or other multiple, helicoidal ramps. Referring to FIG. 1, 1 represents the shell of the dropshaft. 2, 2', and 2" are three intertwined helicoidal ramps attached at their outer periphery to the shell 1. The ramps have a pitch P, as shown, the pitch being the vertical distance taken by any ramp to make one complete revolution.

In FIG. 1, 3 represents the inlet conduit, which conducts the flow into the dropshaft from the basin from which the flow is withdrawn, or delivery conduit 4. The inlet conduit 3 may be of trapezoidal or other cross section; it is sometimes necessary to transition the cross sectional shape from the (usually round) shape of the delivery conduit 4. In this elevation view it can be seen that the inlet conduit is configured to exactly fit three of the ramps—that is, one complete pitch. Moreover, the inlet conduit is inclined at an angle M, an angle equal to the inclination of the ramps 2 relative to the horizontal. This configuration provides for transfer of water from the inlet into the dropshaft with no change in speed or direction, and encountering no sharp edges, all of which cause the water to entrain air.

FIG. 2 is a cross section taken through FIG. 1 along the lines A—A'. In this Figure, the angle N is chosen to provide the required cross-section area of the inlet conduit near its junction with the dropshaft.

Figure 3:
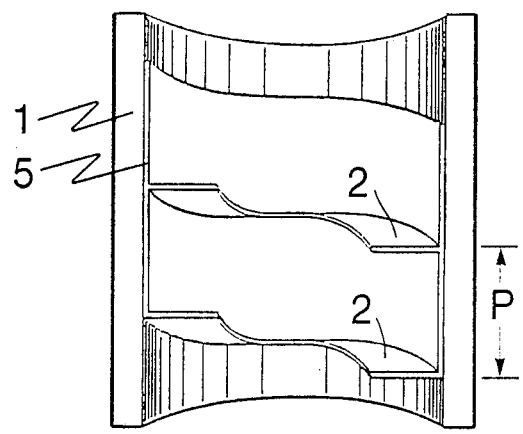
FIG. 3 is a center-plane cross-section of an intermediate center portion of the dropshaft.

FIG. 3 is a detailed view of a diametrical section through an intermediate reach of a single-ramp structure. In FIG. 3 the wall of the dropshaft 1 is clearly shown, the helicoidal ramps 2 being attached to an inner shell 5 which can be fabricated elsewhere and inserted into the dropshaft. In this typical embodiment of the invention, the width of the helicoidal ramps is 25% of the diameter of the dropshaft; the diameter of the open center is 50% of the dropshaft diameter. The pitch P of the helicoidal ramps in this example is 40% of the dropshaft diameter.

Figure 4:
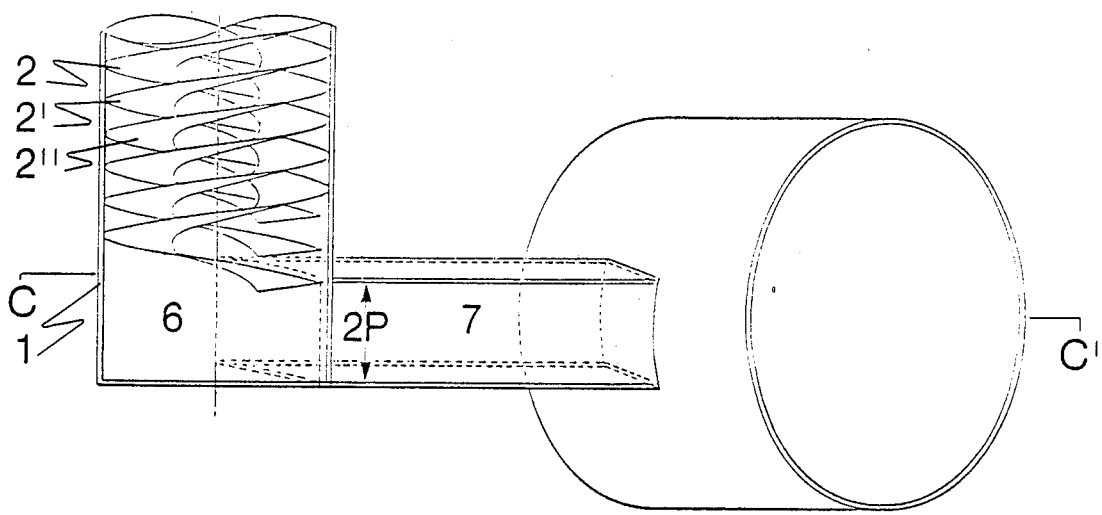
FIG. 4 is a cut-away view in elevation of the lower end of the dropshaft, including the outlet conduit.

FIG. 4 is a cut-away view of the bottom portion of the dropshaft. The helicoidal ramps 2, 2' and 2", terminate about two pitches above the bottom of the dropshaft, forming a swirl chamber 6. Flow entering the chamber from the ends of the helicoidal ramps swirls vigorously within of the chambers. Any entrained air in the water is concentrated by centripetal force at the center of the dropshaft, where it finds easy exit up the center of the dropshaft.

Figure 5:
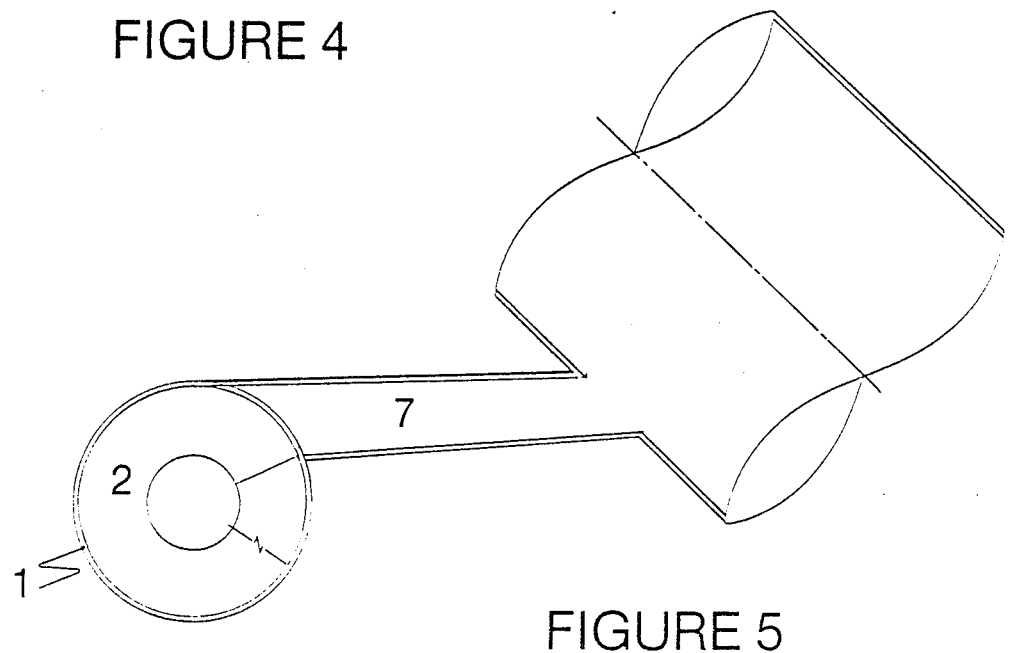
FIG. 5 is a cross-section plan view of the lower end of the dropshaft, including the outlet conduit.

In FIG. 5, a plan view cross section C—C' through FIG. 4 is shown. The outlet conduit 7 leaves the dropshaft nearly tangent to its periphery. The junction with the conveyance tunnel which carries away the flow, is preferably at an angle, as shown.

The embodiments and example recited herein are for illustrative purpose only, and are not to be taken as limiting of the scope of the invention, which is defined in the claims.

What is claimed is:

1. A dropshaft for conducting a liquid flow downward and for dissipating the energy of the flow, the dropshaft comprising a vertical cylinder;

entrance ducts at the top of the cylinder, open to the atmosphere, disposed to deliver the flow into the cylinder in a direction substantially tangent to the periphery of the cylinder, the top and bottom of the entrance ducts being aligned with helicoidal ramps attached to the inside wall of the cylinder and extending radially inwards a distance less than the radius of the cylinder, and terminating above the bottom of the cylinder, whereby flow is constrained in a helicoidal path regardless of the volume of liquid admitted by the entrance ducts, and a colum of air is maintained in the axis of the cylinder;

a chamber at the bottom of the cylinder below the terminus of the helicoidal ramps; and an exit duct at the bottom of the cylinder disposed to convey the flow away from the chamber, the exit duct being disposed in a direction substantially tangent to the periphery of the cylinder.

2. The dropshaft of claim 1 in which the cross-sectional areas of the entrance ducts at their intersections with the dropshaft are such that liquid is delivered to the dropshaft at a speed and direction corresponding to the uniform-flow velocity and initial direction in the channels formed by the helicoidal ramps.

3. A method for dissipating the energy of a liquid flow conveyed down a cylindrical, vertical conduit which comprises the steps of introducing the flow, at atmospheric pressure, through a duct substantially tangent to the periphery of the upper end of the vertical conduit, constraining the flow to a helical path of constant pitch regardless of the velocity of liquid through the duct as it descends the vertical conduit by means of structural elements attached to the inner walls of the conduit even when the liquid flow does not completely fill the duct, while maintaining an open central column of air in contact with the surface of the liquid, and providing means for extracting the liquid from the bottom of the vertical conduit, the means exiting the conduit in a direction substantially tangent to the periphery of the conduit.

4. A dropshaft for conducting a liquid flow downward and for dissipating the energy of the flow, the dropshaft comprising a vertical cylinder;

an entrance duct at the top of the cylinder, open to the atmosphere, disposed to deliver the flow into the cylinder in a direction substantially tangent to the periphery of the cylinder, the top and bottom of the entrance duct being aligned with a helicoidal ramp attached to the inside wall of the cylinder and extending radially inwards a distance less than the radius of the cylinder, and terminating above the bottom of the cylinder, whereby flow is constrained in a helicoidal path regardless of the volume of liquid admitted by the entrance duct, and a central column of air is maintained in the cylinder;

a chamber at the bottom of the dropshaft below the terminus of the helicoidal ramp; and an exit duct at the bottom of the cylinder disposed to convey the flow away from the chamber, the exit duct being disposed in a direction substantially tangent to the cylinder.

* * * * *